US006662222B2

(12) United States Patent
Ishii et al.

(10) Patent No.: US 6,662,222 B2
(45) Date of Patent: *Dec. 9, 2003

(54) APPARATUS AND METHOD OF MANAGING SYSTEM, AND MACHINE READABLE STORAGE MEDIUM FOR STORING PROGRAM

(75) Inventors: Sugio Ishii, Komae (JP); Hirobumi Toyoshima, Yamato (JP); Yasuhide Niimura, Yokohama (JP); Kazuhito Akiyama, Machida (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,742

(22) Filed: Aug. 18, 1998

(65) Prior Publication Data

US 2002/0013855 A1 Jan. 31, 2002

(30) Foreign Application Priority Data

Aug. 19, 1997 (JP) .............................................. 9-222181

(51) Int. Cl.[7] .............................................. G06F 15/173
(52) U.S. Cl. ........................................................ 709/224
(58) Field of Search ................................. 709/220, 221, 709/222, 223, 224, 225, 227, 228

(56) References Cited

U.S. PATENT DOCUMENTS

| 5,826,241 A | * | 10/1998 | Stein et al. | ............... 705/26 |
| 5,956,725 A | * | 9/1999 | Burroughs et al. | ......... 707/101 |
| 5,983,270 A | * | 11/1999 | Abraham et al. | ........... 709/224 |
| 6,085,244 A | * | 7/2000 | Wookey | ..................... 709/224 |
| 6,122,641 A | * | 9/2000 | Williamson et al. | ........ 707/103 |
| 6,151,643 A | * | 11/2000 | Cheng et al. | ................. 710/36 |

OTHER PUBLICATIONS

Microsoft Press Computer Dictionary, Third Edition, 1997, pp. 403–404.*

* cited by examiner

Primary Examiner—Glenton B. Burgess
Assistant Examiner—Tod A Kupstas
(74) Attorney, Agent, or Firm—Gail H. Zarick; Anne Vachan Dougherty (57) ABSTRACT

A system management apparatus and method adapted for use in a network system that comprises a plurality of devices such as computers connected via a network, whereby it is possible to automatically manage device information unique to each of the devices in association with users of the devices and subordinate organizations that possess the devices. The system and method additionally allow for automatically creating a database for managing device information of each device that constitutes a network system, thereby reducing system administrator's efforts required for system management operations. Moreover, in accordance with the system management apparatus and method of this invention, it is possible to interlock a database for managing device information of each device that constitutes a network system with another database for managing information of subordinate organizations having the devices and users of the devices such that a change in the users and the subordinate organizations is automatically reflected in the device information of each device, thereby facilitating maintenance and management of the device information.

10 Claims, 10 Drawing Sheets

APPARATUS AND METHOD OF MANAGING SYSTEM, AND MACHINE READABLE STORAGE MEDIUM FOR STORING PROGRAM

FIELD OF THE INVENTION

This invention relates to a system management apparatus and a method for use in a network system, which may be provided in a business organization, for managing serial numbers and users of respective devices (e.g., computers or the like) in the system on a user basis and/or a subordinate organization basis.

BACKGROUND OF THE INVENTION

A network system, comprising a plurality of computers connected via a network, has been used in the art to perform data processing, data transfers and the like. In general, system management operations in such a system have been performed by associating information unique to devices (constituents of the system) with users and subordinate organizations that possess the devices respectively.

For example, Japanese Patent Publications, identified in Japanese as Tokkai sho 63-114337, Tokkai hei 4-79446, Tokko hei 1-16066 and Tokko hei 7-44541 (References 1 to 4), disclose electronic mail schemes and data transfer schemes, each exploiting such a network system. However, these References merely disclose methods for associating destinations and routes of mails (data) with subordinate organizations of users and names thereof. In another words, none of the References discloses a method of automatically managing information of devices in association with users and subordinate organizations.

In view of the aforementioned problems of the prior art, it is an object of this invention to provide a system management apparatus and a method for use in a network system, comprising a plurality of devices such as computers connected via a network, which are capable of automatically managing device information unique to each of the devices in association with subordinate organizations possessing the devices and users thereof.

It is an object of the invention to automatically manage device data unique to each of the devices that constitutes a network system in association with users of devices and subordinate organizations that possess the devices.

It is another object of this invention to provide a system management apparatus and a method, for automatically creating a database for managing device information relating to each of the devices (constituents of a network system), thereby to reduce system administrator's efforts required for system management operations.

It is yet another object of this invention to provide a system management apparatus and a method, which cause a database for managing device information relatung to each of the devices (constituents of a network system) to be interlocked or collaborated with another database for managing information of subordinate organizations possessing the devices and users thereof, whereby a change in a user and/or a subordinate organization is automatically reflected in the device information of each device in a way to facilitate maintenance and management of the device information.

SUMMARY OF THE INVENTION

In order to accomplish said objects of this invention, there is provided a first system management apparatus, for use in a system including one or more managed devices for managing a device data item of each of said managed devices, which comprises an information database for storing one or more information data items, each having a keyword data item; a device database for storing one or more device data items, each being unique to each of said managed devices, and for storing each of said keyword data items in association with each of said device data items; and data change/management means, being responsive to a change in a given one of said information data items, for changing a given one of said device data items, stored in said device database in association with said keyword data item of said given one of said information data items, consistent with said change in said given one of said information data items, thereby managing said device data items of said managed devices.

Further in accordance with another aspect of this invention, there is provided a second system management apparatus for use in a system including one or more managed devices, wherein said managed devices and said second system management apparatus communicate with each other via a network, each of said managed devices having a unique device data item and a keyword data item assigned thereto, and each of said managed devices being responsive to a scanning operation via said network for returning said assigned device data item and keyword data item. Said second system management apparatus is adapted for managing a device data item of each of said managed devices, and it comprises an information database for storing one or more information data items, each having said keyword data item; a device database for storing said device data items of said managed devices respectively, and for storing said keyword data items in association with said device data items respectively; device change detecting means for scanning each of said managed devices, said device change detecting means, being responsive to said device data item and said keyword data item returned from each of said managed devices, for detecting a device change that includes a change in a given one of said managed devices and/or a change in a given one of said device data items; and, first device database updating means for updating said device data item and said keyword data item, stored in said device database and assigned to a given one of said managed devices, consistent with said detected device change.

Preferably, said information data item and said device data partly overlap each other, and said first or second system management apparatus further comprises second device database updating means for updating the overlapped portion of said device data item, stored in said device database and assigned to a given one of said managed devices, consistent with said information data item which is stored in said information database and which has said keyword data item associated with said device data item to be updated. Preferably, said information data item represents an information item of a user of said managed device, said keyword data item represents a user of said managed device, and said device A data item includes at least a portion of an information item of a user of said managed device.

In an exemplary environment where a plurality of computers having peripheral devices such as printers (managed devices) are connected via a network for communicating with each other via the network, each of said first and second system management apparatuses automatically updates and manages contents of a database (device database), which stores and manages device data items uniquely assigned to the managed devices, such as manufacturer's serial numbers (serial numbers), identification numbers of users (employee numbers), organizational numbers (organizational codes) of users' subordinate organizations and the like, in association with contents of another database (information database), which stores and manages identification numbers of users and information items relating to users' subordinate organizations.

In a typical case where changes of users (i.e., personnel changes occur due to renewal of subordinate organizations and such changes give rise to changes in the information database, said data change/management means of said first system management apparatus uses employee numbers or the like of data items relating to the changed users as keywords (keyword data items), which are commonly stored in the device database and the information database respectively, retrieves device data items of computers that were used by the users who left their subordinate organizations from those data items stored in the device database, and then changes such device data items of computers found as a result of the retrieval so as to make such device data items consistent with contents of the changed information database. Thus, said data change/management means replaces the employee numbers or the like of device data items of computers that were used by the users who left their subordinate organizations with other employee numbers or the like of other users who are newly added due to the personnel changes, thereby preventing any disagreement or inconsistency between contents of the device database and the information database.

Further, in said second system management apparatus of this invention, a device data item is assigned to each of the computers (managed devices) respectively, and each of the computers has functions for transmitting the assigned device data item to said second system management apparatus via said network in response to a request therefrom. Said first device database updating means issues a request to each of the computers via the network for transmitting a device data item at a specified time (e.g., at the time of starting system operations, after starting the system operation, at periodical intervals, or in response to a system administrator's action), detects addition/removal of a computer to/from the network system or any setup change for computers, and then changes contents of the device database consistent with the detected changes. Thus, said first device database updating means periodically adds a device data item of a newly added computer into the device database, erases a device data item of a removed computer, or changes device data items stored in the device database consistent with a device data item obtained from a computer subject to a setup change for causing the device data items to be consistent with those device data items actually set up for computers in the network system.

Further, in accordance with another aspect of this invention, there is provided a first system management method for use in a system including one or more managed devices for managing a device data item of each of said managed devices, which comprises the steps of: storing one or more information data items, each having a keyword data item; storing one or more device data items, each being unique to each of said managed devices, and storing each of said keyword data items in association with each of said device data items; and responsive to a change in a given one of said information data items, changing a given one of said device data items stored in said device database in association with said keyword data item of said given one of information data items, with said change in said given one of information data items, thereby managing said device data items of said managed devices.

Further, in accordance with another aspect of this invention, there is provided a second system management method for use in a system including one or more managed devices and a system management apparatus for managing a device data item of each of said managed devices, wherein said managed devices and said system management apparatus communicate each other via a network, each of said managed devices has a unique device data item and a keyword data item assigned thereto, each of said managed devices being responsive to a scanning operation via said network for returning said assigned device data item and keyword data item. Said second system management method comprises the steps of: storing one or more information data items, each having said keyword data item; storing said device data items of said managed devices respectively, and storing said keyword data items in association with said device data items respectively; scanning each of said managed devices and, responsive to said device data item and said keyword data item returned from each of said managed devices, detecting a device change that includes a change in a given one of said managed devices and/or a change in a given one of said device data items; and updating said device data item and said keyword data item stored in said device database and assigned to a given one of said managed devices, consistent with said detected device change.

Further in accordance with another aspect of this invention, there is provided a first machine readable storage medium for storing a program adapted for use in a system including one or more managed devices and a system management apparatus for managing a device data item of each of said managed devices. Said program is executable by a computer for causing said system management apparatus to carry out machine-effected steps of: storing one or more information data items, each having a keyword data item; storing one or more device data items, each being unique to each of said managed devices, and storing each of said keyword data items in association with each of said device data items; and responsive to a change in a given one of said information data items, changing a given one of said device data items, which is stored in said device database in association with said keyword item of said given one of information data items, consistent with said change in said given one of information data items, thereby managing said device data items of said managed devices.

Further, in accordance with another aspect of this invention, there is provided a second machine readable storage medium for storing a program adapted for use in a system including one or more managed devices and a system management apparatus for managing a device data item of each of said managed devices, wherein said managed devices and said system management apparatus communicate with each other via a network, each of said managed devices having a unique device data item and a keyword data item assigned thereto, and each of said managed devices being responsive to a scanning operation via said network for returning said assigned device data item and keyword data item. Said program is executable by a computer for causing said system management apparatus to carry out machine-effected steps of: storing one or more information data items, each having said keyword data item; storing said device data items of said managed devices respectively, and storing said keyword data items in association with said device data items respectively; scanning each of said managed devices and, responsive to said device data item and said keyword data item returned from each of said managed devices, detecting a device change that includes a change in a given one of said managed devices and/or a change in a given one of said device data items; and updating said device data item and said keyword data item, which are stored in said device database and are assigned to a given one of said managed devices, consistent with said detected device change.

BRIEF DESCRIPTION OF THE DRAWINGS

The invention will now be described in greater detail with reference to the appended drawings wherein.

DESCRIPTION OF THE PREFERRED EMBODIMENT

Figure 1:
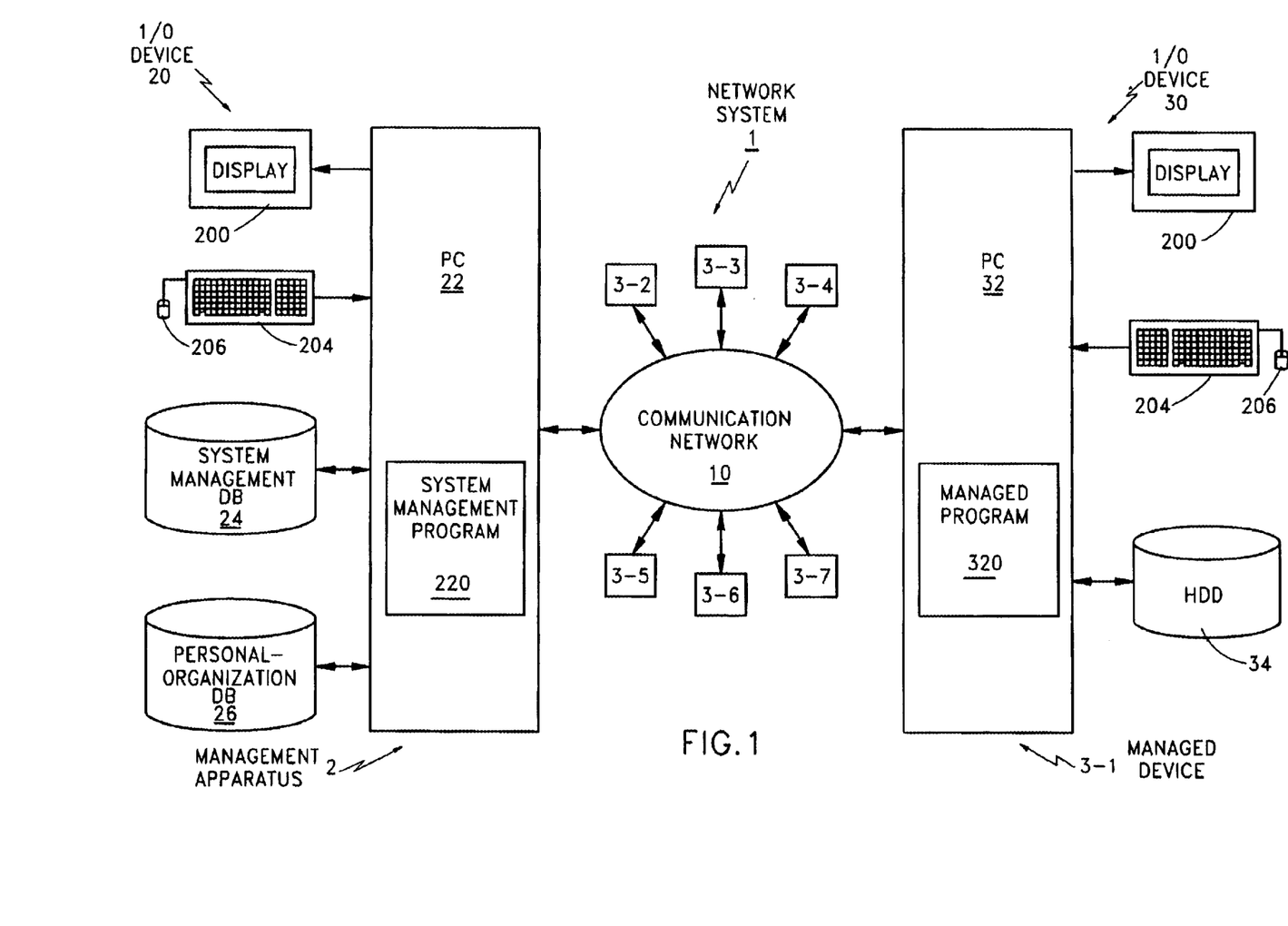
FIG. 1 is a diagram showing a network system wherein a system management method of this invention may be applied.

FIG. 1 shows a network system 1, wherein a network management method of this invention may be applied. As shown in FIG. 1, the network system 1 comprises k management apparatuses 2 (FIG. 1 exemplifies a case of k=1), managed devices 3-1 to 3-m (FIG. 1 exemplifies a case of m=7), and a communication network 10, such as a data communication network, an ISDN network or a LAN network, which is capable of supporting data communication (without distinction of protocols). Hereinbelow, when an arbitrary one of the managed devices 3-1 to 3-m is referred to, it will be simply called "managed device 3" in singular or plural form, as the case may be.

The network system 1, with these constituents, transmits data between the management apparatus 2 and the managed devices 3, processes the same, and automatically changes device data (which is unique to each of the managed devices 3) consistent with any addition/removal of the managed devices 3 and/or any setup change for the managed devices 3, as well as any change of personnel information such as a reshuffling of users of the managed devices 3 and the like.

Management Apparatus 2

The management apparatus 2 comprises, for example, a display device 200 such as a CRT display or the like, an input/output device 20 having an input device including a keyboard 204 and a mouse 206 for accepting a user's action, a computer 22 having data communication functions and executing a system management program 220, a system management database (DB) 24 and a database (DB) 26 for personnel-organization information. Note that, in the management apparatus 2, the system management database 24 and the personnel-organization database 26 may be implemented by using hardware other than the computer 22, or they may be implemented as software that uses resources of the computer 22.

System Management Program 220

The system management program 220 implements system management functions of the management apparatus 2 as described below. For each of the subordinate organizations (e.g., divisions/sections in a business organization) that use the network system 1, the system management program 220 stores names and identifiers (employee numbers) of employees (users) who belong to this subordinate organization in the personnel-organization database 26 in association with an identifier (organizational number) of this subordinate organization for management purpose (Function A). Hereinbelow, such data stored into the personnel-organization database 26 and managed therein will be collectively called "personnel information data".

Further, in response to acceptance of a system administrator's action entered via the keyboard 204 or the like, the system management program 220 retrieves the system management database 24 by using employee numbers (keywords) included in the personnel information data stored in the personnel-organization database 26, issues a request to a given one of the managed device 3 that is being used by a designated user for transmitting device data, receives the device data returned from such managed device 3 in response to the request, and displays the received device data on the display device 200 (Function B: system display function).

Further, at the time of starting operations of the management apparatus 2, for example, the system management program 220 issues requests to each of the managed devices 3 via the communication network 10 for transmitting device data, receives the device data returned from each of the managed devices 3 in response to the requests, and stores the received device data into the system management database 24 for management therein. Note here that the device data so returned includes additional data (e.g., employee numbers of users who use the managed devices 3, organizational numbers of subordinate organizations that possess the managed devices 3, contact points of the users and the like) that may be changed in accord with personnel changes, as well as data unique to each of the managed devices 3 (e.g., manufacturer's serial numbers, device names, network addresses, memory amounts, configurations of hard disks and the like).

Further, after starting operations of the network system 1, at periodical intervals, or in response to a system administrator's action entered via the keyboard 204 or the like, for example, the system management program 220 issues requests to each of the managed devices 3 via the communication network 10 for transmitting the latest device data, receives the device data returned from each of the managed devices 3 in response to the requests, detects any addition/removal of the managed devices 3, or any setup change of device data for the managed devices 3, and updates device data in the system management database 24 in line with the actual system configurations and device data in the network system 1 (Function C: system scanning function).

Further, the system management program 220 retrieves personnel information data stored in the personnel-organization database 26 by using keywords (employee numbers or the like that are commonly stored in the system management database 24 and the personnel-organization database 26) of the device data returned from the managed devices 3, transmits the additional data of the personnel information data that is obtained as a result of the retrieval to the managed devices 3, and updates the device data assigned to the managed devices 3 (Function D: system information update function).

Further, should there be changes in members (users) of subordinate organizations due to personnel changes and give rise to changes in the contents of the personnel information data stored in the personnel-organization database 26, the system management program 220 uses employee numbers or the like as keywords, changes/updates the device data in the system management database 24 associated with the changed points of personnel information data in line with the personnel information data, thereby avoiding any discrepancy or inconsistency between the contents of the device data in the system management database 24 and the contents of the personnel information data in the personnel-organization database 26 (Function E: database synchronization function).

Further, the system management program 220 accepts device data set up by a system administrator via the keyboard 204 or the like, and transmits the device data to a given one of the managed devices 3 via the communication network 10, thereby causing the device data of this managed device 3 to be updated (Function F).

Managed Devices 3

Similar to the management apparatus 2, each of the managed devices 3 comprises, for example, a display device 200, an input/output device 30 having an input component, a computer 32 having data communication functions and capable of executing a managed program 320, and a hard disk drive 34 for storing device data entered from the input/output device 30. While FIG. 1 illustrates constituents of the managed device 3-1 alone, it should be understood that each of the other managed devices 3-2 to 3-m has the same constituents as well.

Managed Program 320

As described below, the managed program 320 has functions required for accepting management by the management apparatus 2. The managed program 320 accepts a user's setup action for device data entered via the keyboard 204 or the like, and stores the device data in a non-volatile storage device such as the hard disk drive 34 (Function a). Further, the managed program 320 reads device data from the hard disk drive 34 in response to a request transmitted from the management apparatus 2 via the communication network 10, and transmits the read device data to the management apparatus 2 via the communication network 10 (Function b). Further, the managed program 320 receives new device data from the management apparatus 2 via the communication network 10, and replaces old device data stored in the hard disk drive 34 with the new device data to update a setup of device data (Function c).

Operations of Network System 1

Hereinbelow, operations of the network system 1 adapted for implementing primary ones of the aforementioned system management functions will be described.

Setup of Device Data for Managed devices 3

Figure 2:
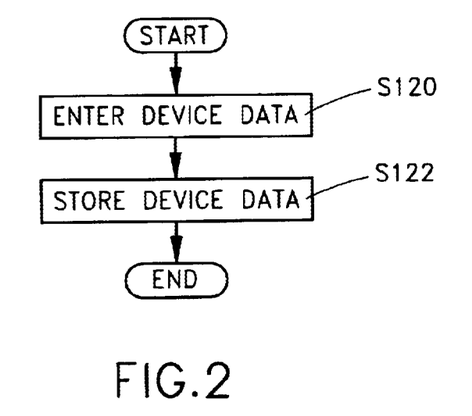
FIG. 2 is a flow chart showing a setup process of device data in a managed program shown in FIG. 1.

First, with reference to FIG. 2, a setup process of device data for the managed devices 3 (corresponding to said Function a) will be described. FIG. 2 is a flow chart showing a setup process of device data by the managed program 320 shown in FIG. 1. As shown in FIG. 2, at step 120 (S120), the managed program 320 accepts device data entered by a user via the keyboard 204. At step 122 (S122), the managed program 320 stores the accepted device data into the hard disk drive 34.

Summary of Process of System Management Program 220

Figure 3:
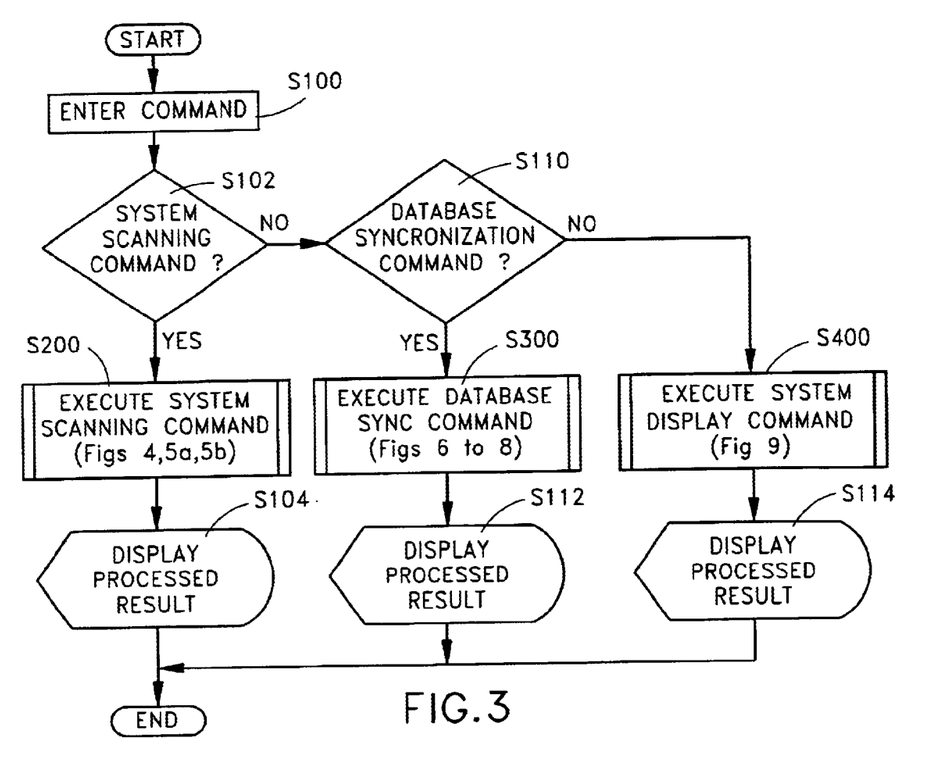
FIG. 3 is a flow chart schematically showing a process of a system management program shown in FIG. 1.

Next, with reference to FIG. 3, a summary of process of the system management program 220 of the management apparatus 2 will be described. FIG. 3 is a flow chart schematically showing a process (main program) of the system management program 220 shown in FIG. 1. As shown in FIG. 3, at step 100 (S100), the system management program 220 accepts a system administrator's action entered via the keyboard 204 or the like. At step 102 (S102), the system management program 220 analyzes the entered command, and determines if the entered command is a predetermined command (a system scanning command or a system information update command) that corresponds to either of Functions C, D (the system scanning function or the system information update function). If the entered command is a system scanning command or a system information update command, the system management program 220 proceeds to S200. Otherwise it continues to perform a command analysis process of S110. Note that details of the system scanning process (S200) will be described below with reference to FIGS. 4 and 5.

At step 110 (S110), the system management program 220 determines if the entered command is a database synchronization command that corresponds to Function E. If the entered command is a database synchronization command, the system management program 220 proceeds to a database synchronization process at step S300. Otherwise, the system management program 220 determines that the entered command is a system display command that corresponds to Function B (system display function), and proceeds to the system display process at step S400. Note that details of the database synchronization process (S300) will be described below with reference to FIGS. 4 to 8, whereas details of the system display process (S400) will be described below with reference to FIG. 9. At each of the steps 104, 112, 114 (S104, S112, S114), the system management program 220 displays executed results of S200, S300, S400 on the display device 200.

System Scanning Process and System Information Update Process

Figure 4:
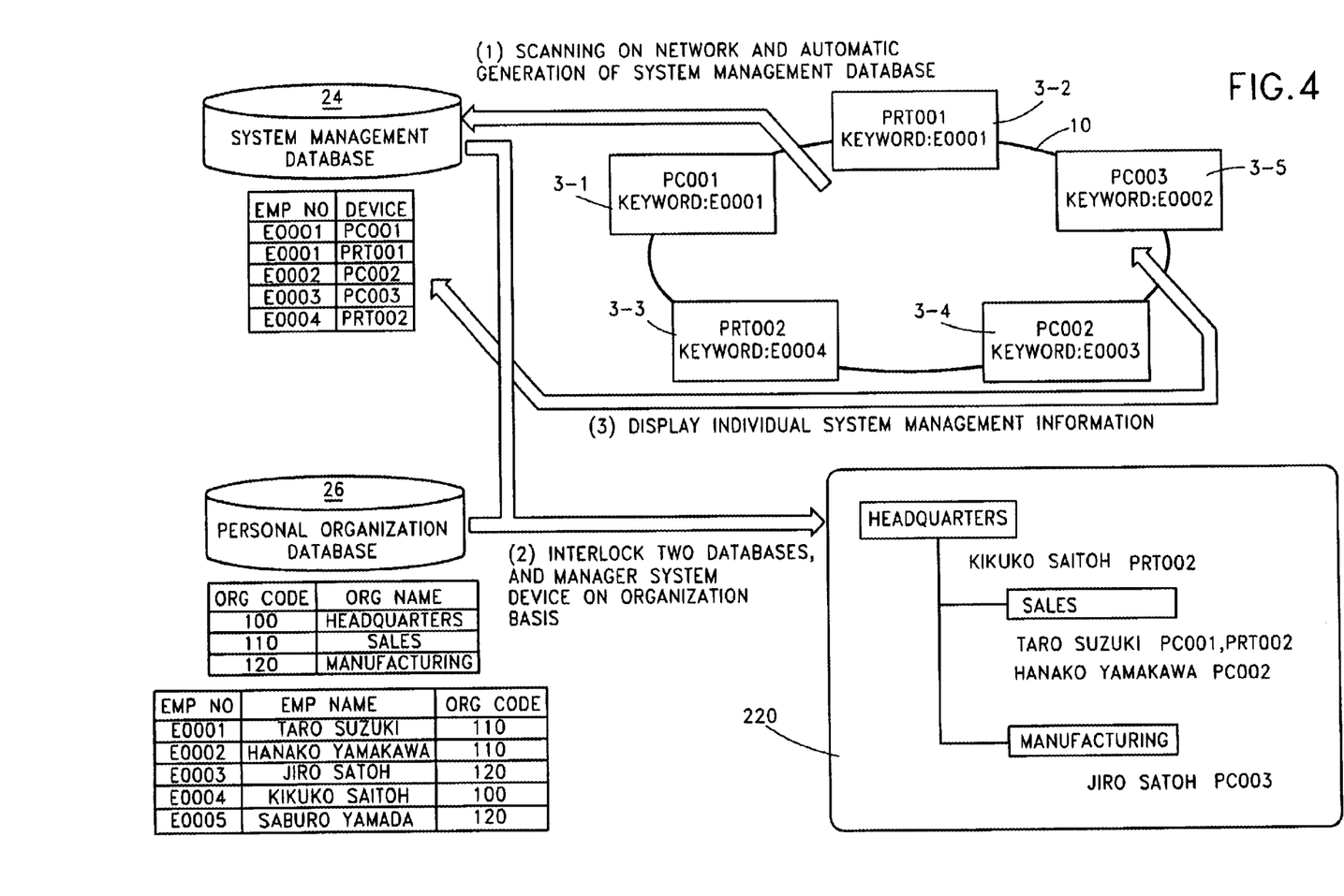
FIG. 4 is a diagram exemplifying a summary of a system scanning process shown in FIG. 3.
Figure 5A:
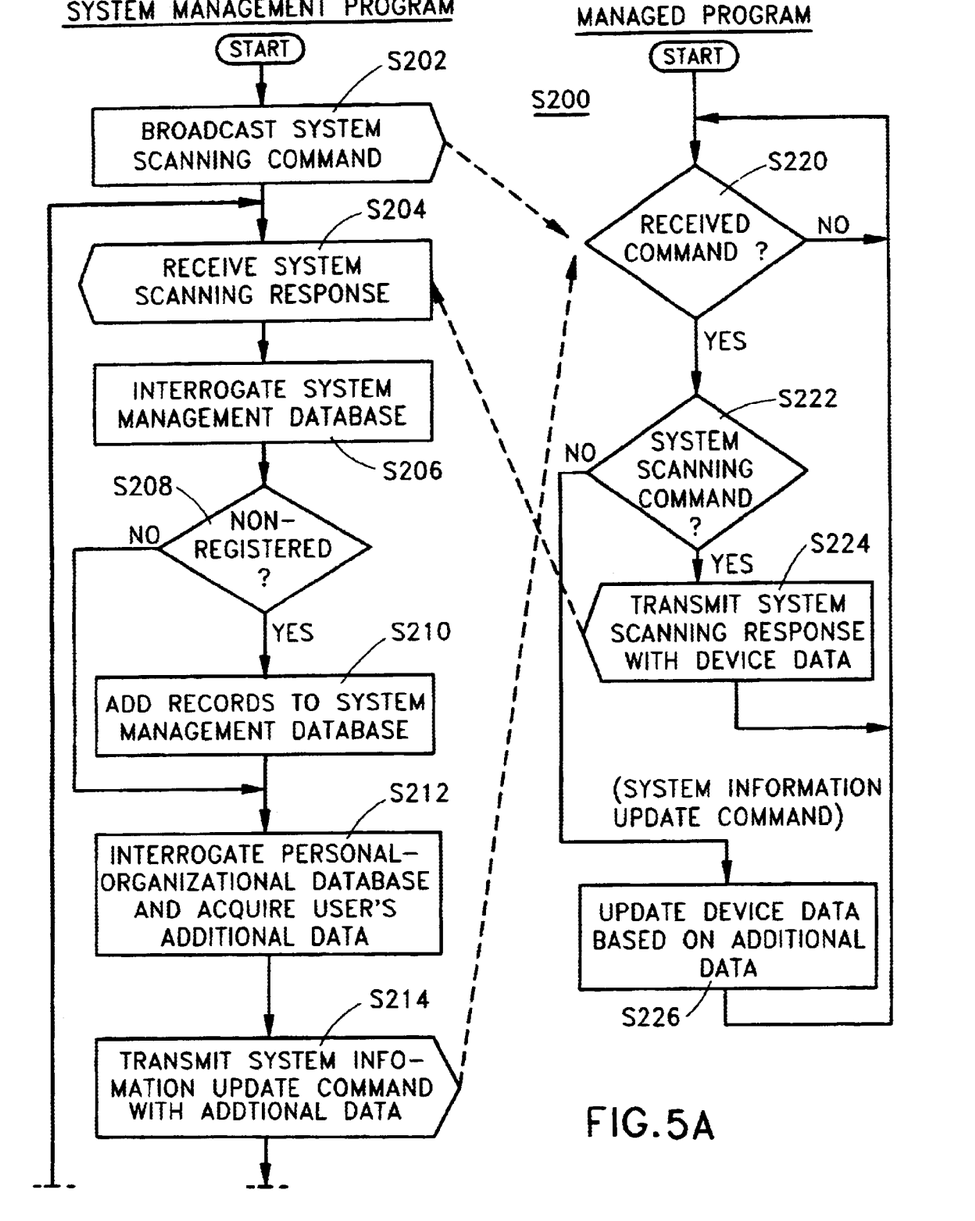
FIG. 5 is a flow chart showing a system scanning process shown in FIGS. 3 and 4.
Figure 5B:
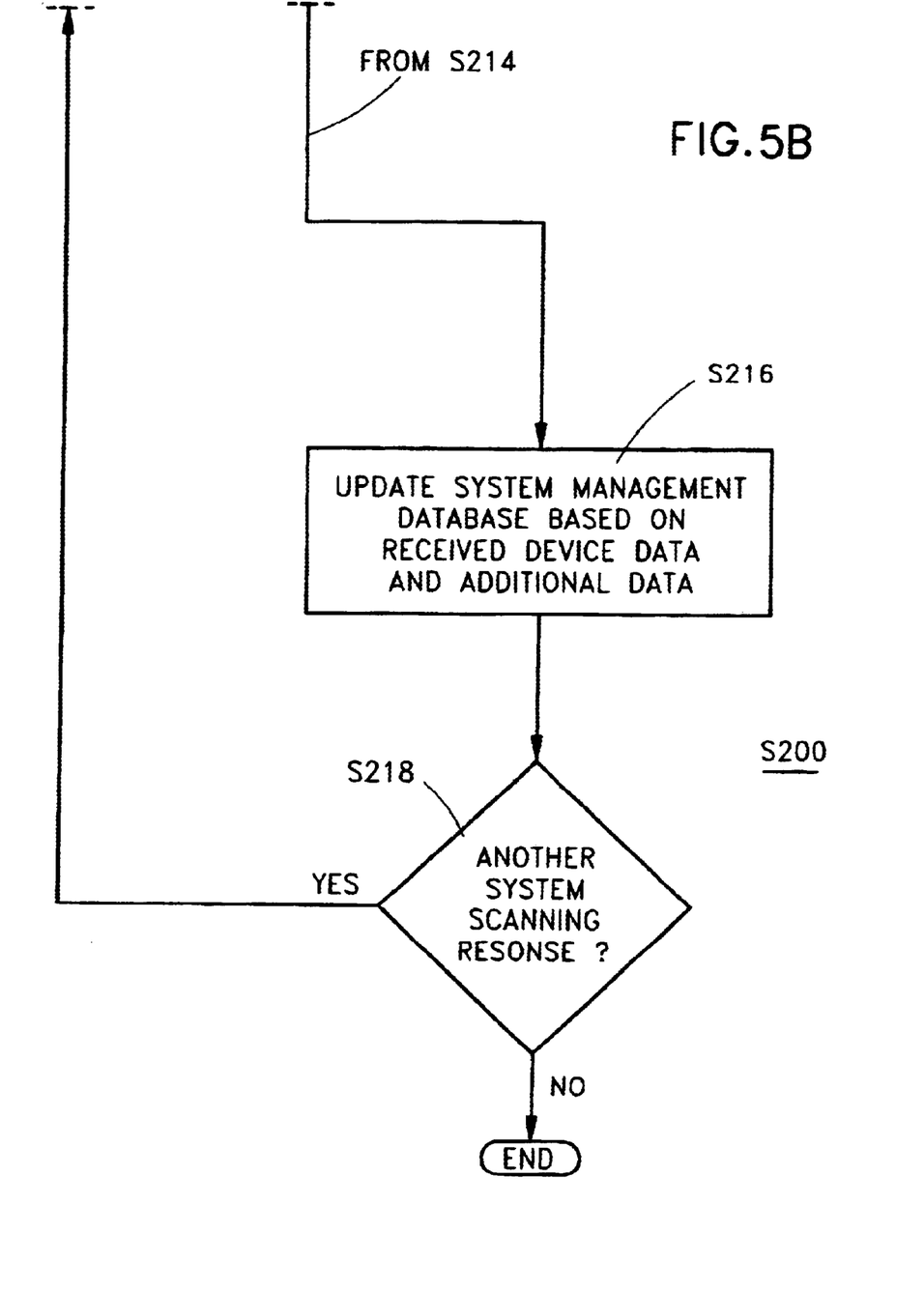

Now, with reference to FIGS. 4 and 5, the system scanning process (Function C) and the system information update process (Function D), shown in FIG. 3 as S200, will be described. FIG. 4 is a diagram exemplifying a summary of the system scanning process shown in FIG. 3. FIG. 5 is a flow chart showing the system scanning process shown in FIGS. 3 and 4. In the system scanning process, the system management program 220 of the management apparatus 2 communicates with the managed programs 320 of the managed devices 3 and, as briefed at legend (1) in FIG. 4, collects device data of each of the managed devices 3, including device numbers (serial numbers) of computers PC001 to PC003, as well as device numbers of peripheral devices (printers) PRT001, PRT002, arranges the collected device data by using employee numbers (E0001 to E0004) as keywords, thereby to automatically generate data to be stored in the system management database (SM-DB) 24.

Further, as briefed at legend (2) in FIG. 4, the system management program 220 interlocks the system management database (SM-DB) 24 with the personnel-organization database (PO-DB) 26 to manage device data and, as briefed at legend (3) in FIG. 4, classifies users' employee numbers of personnel information data stored in the personnel-organization database 26 for each of the subordinate organizations, thereby to display device data of each of the managed devices 3 in association with the classified user's employee number or the user's name (process of S104 shown in FIG. 3).

Now details of the system scanning process will be described. First, procedures (S202 to S218) executable on the management apparatus 2 in the system scanning process will be described. As shown in FIG. 5, at step 202 (S202), the system management program 220 broadcasts a system scanning command to each of the managed devices 3 via the communication network 10 to request transmission of device data assigned to each of the managed devices 3. Upon receipt of the system scanning command, respective managed programs 320 (in each of the managed devices 3) return a system scanning response, including device data stored in the hard disk drive 34, to the management apparatus 2. At step 204 (S204), the system management program 220 receives the system scanning response returned from each of the managed devices 3 via the communication network 10.

At step 206 (S206), the system management program 220 retrieves/interrogates the system management database (SM-DB) 24, by using the keyword (e.g., employee number) included in the device data of the system scanning response returned from each of the managed devices 3. At step 208 (S208), the system management program 220 determines, based on the interrogated result of the system management database 24 at S206, if each of the managed devices 3 that has returned the system scanning response is registered in the system management database 24 and, if so, it proceeds to S210. Otherwise, it branches to S212.

At step 210 (S210), the system management program 220 adds records (device data) of non-registered managed devices 3 to the system management database 24. At step 212 (S212), the system management program 220 retrieves/ interrogates the personnel-organization database (PO-DB) 26, by using a keyword (employee number) included in the device data of a received system scanning response, and acquires personnel information data of a user including this keyword.

At step 214 (S214), the system management program 220 transmits a system information update command to a designated one of the managed devices 3 for updating additional data included in device data that has been assigned to this managed devices 3. Note in this respect that, among the data included in the acquired personnel information data, said system information update command includes additional data (employee number of the user, organizational number of the subordinate organization that possesses this managed devices 3, contact point of the user, and the like) in the device data. At step 216 (S216), the system management program 220 updates device data in the system management database 24 such that the content of device data received from this managed device 3 and additional data in the personnel information data obtained as a result of the retrieval/interrogation to the personnel-organization database 26 matches with content of associated device data in the system management database 24. Thereafter, the system management program 220 displays the processed results on the display device 200 (S112 in FIG. 3). At step 218 (S218), the system management program 220 determines if another system scanning response has been received from any of the remaining managed devices 3 and, if so, it proceeds to S204. Otherwise, it terminates the process.

Now, procedures (S220 to S226) executable on a given one of the managed devices 3 will be described. At step 220 (S220), the managed program 320 of this managed devices 3 determines if a system scanning command or a system information update command has been received from the management apparatus 2 via the communication network 10 and, if so, proceeds to S222. At step 222 (S222), the managed program 320 determines if the received command is a system scanning command and, if so, it proceeds to S224. Otherwise, it determines that the received command is a system information update command and branches to S226.

At step 224 (S224), the managed program 320 acquires device data stored in the hard disk drive 34, transmits a system scanning response including the acquired device data to the management apparatus 2 via the communication network 10, and proceeds to S220 (Function b). At step 226 (S226), the managed program 320 updates device data stored in the hard disk drive 34 in line with additional data included in the system information update command received from the management apparatus 2 (Function c).

First Database Synchronization Process
(Function E)

Figure 6:
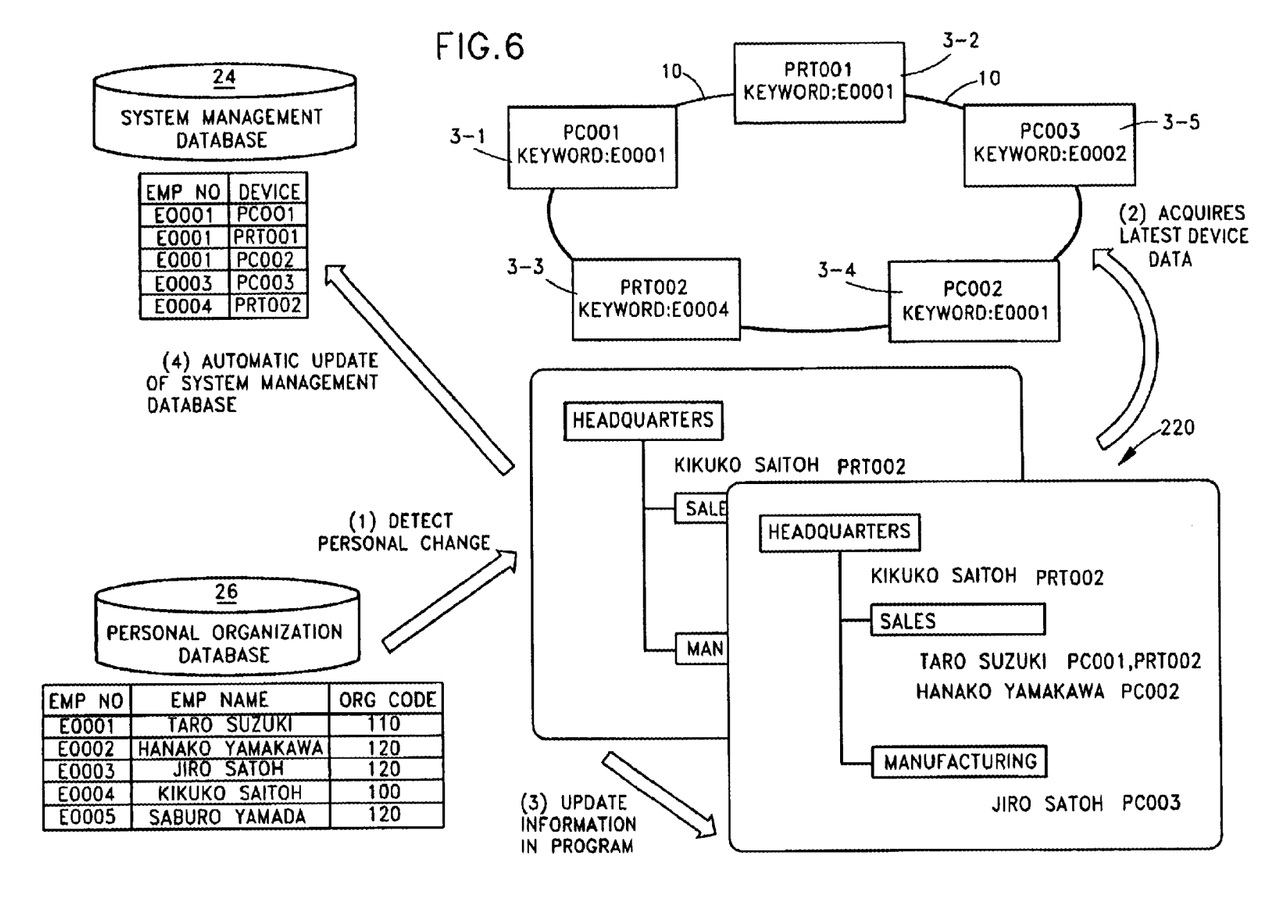
FIG. 6 is a diagram showing a summary of a first database synchronization process shown in FIG. 3.
Figure 7A:
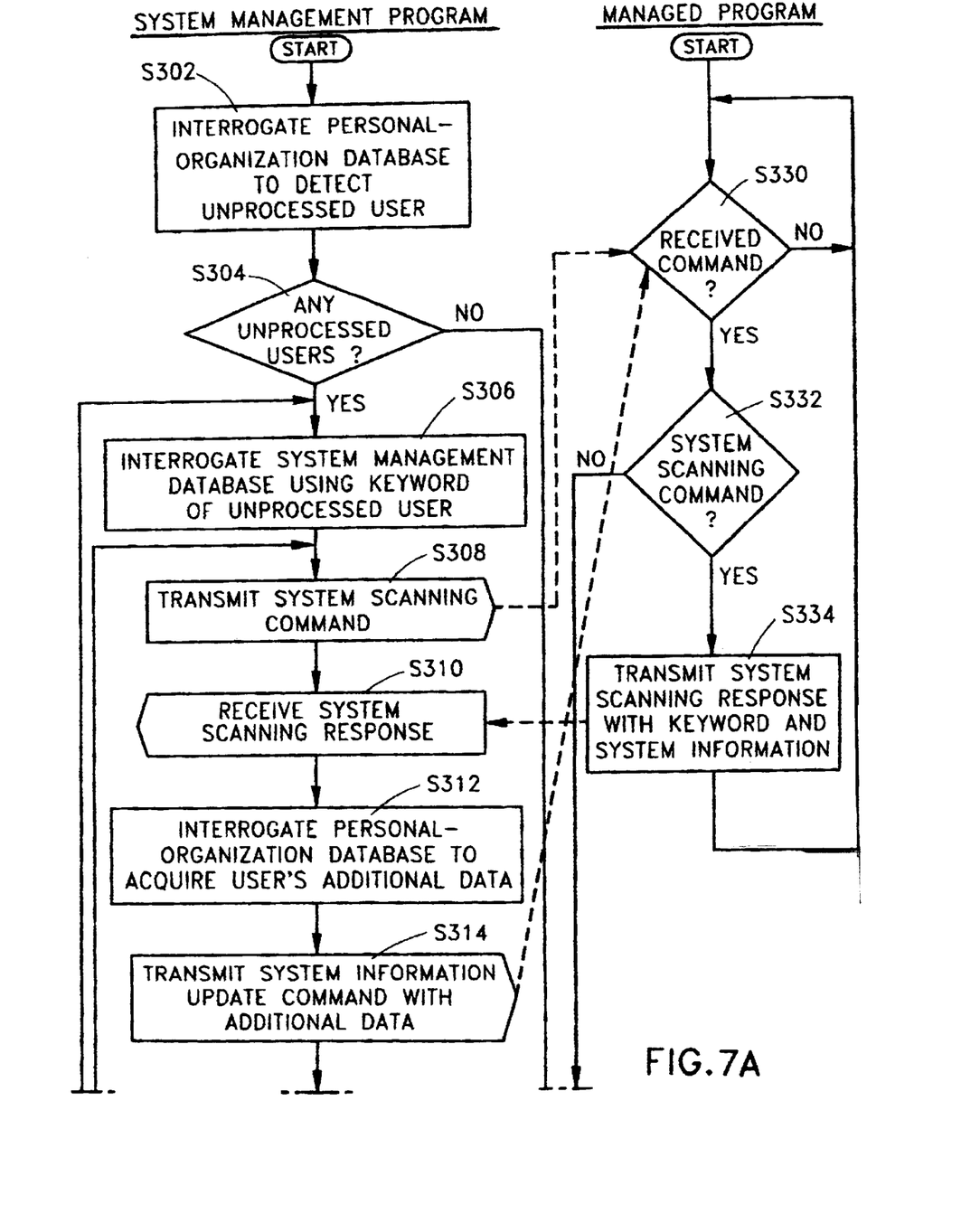
FIG. 7 is a flow chart showing a first database synchronization process shown in FIGS. 3 and 6.
Figure 7B:
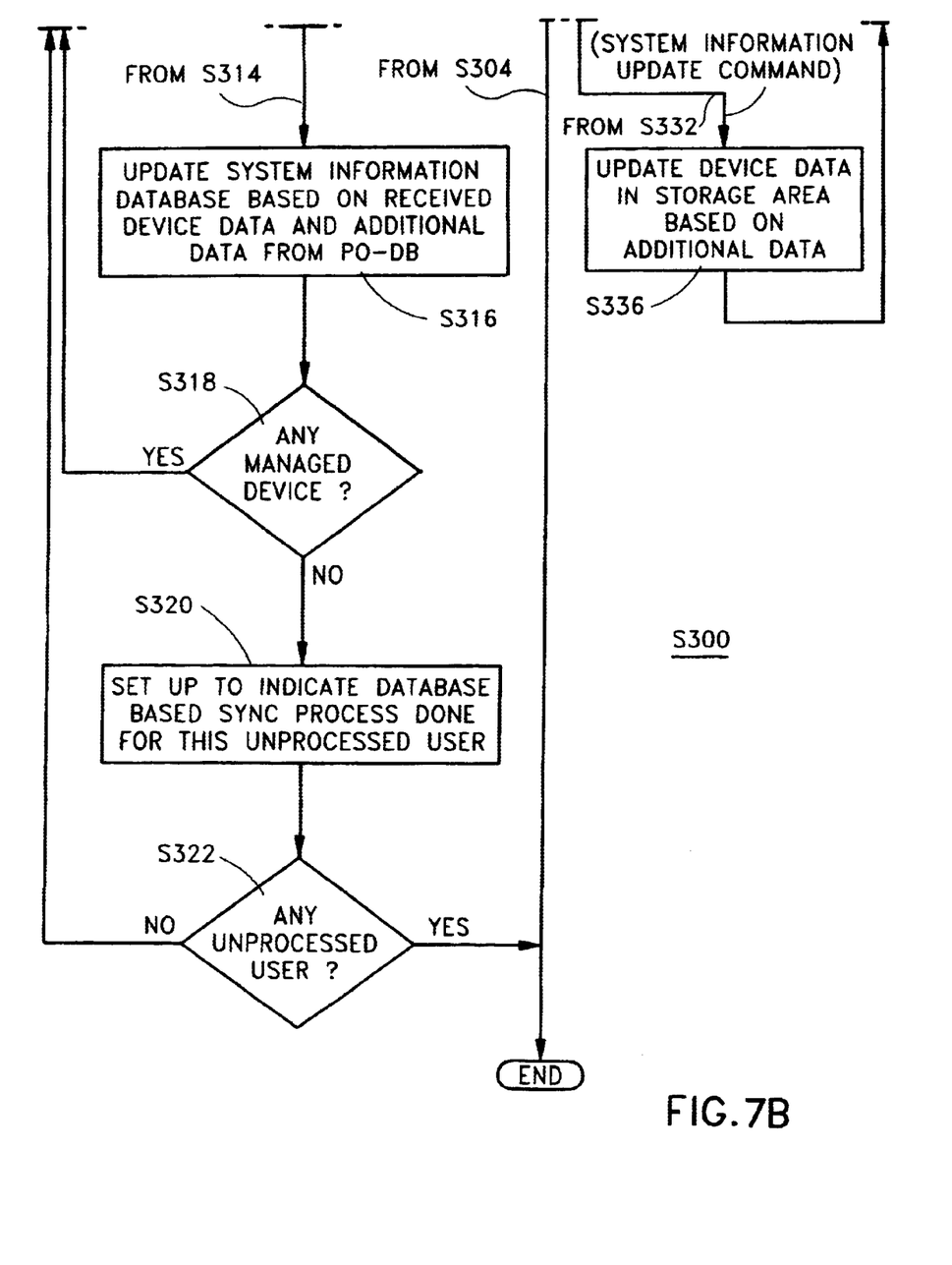

Hereinbelow, with reference to FIGS. 6 and 7, a first database synchronization process (S300 in FIG. 3; Function E), which is adapted for use in a case where personnel information data in the personnel-organization database 26 has been changed due to a personnel change, will be described in detail. FIG. 6 is a diagram showing a summary of the first database synchronization function shown in FIG. 3. FIG. 7 is a flow chart showing the first database synchronization function shown in FIGS. 3 and 6.

If, before execution of the first database synchronization process, there occurs a change in a subordinate organization that uses the network system 1, this organizational change will be reflected in the personnel-organization database 26 as changes personnel information data stored therein. It is assumed here for the purpose of explaining a specific example as shown in FIG. 6 that "Hanako Yamakawa", a user of an employee number E0002, leaves a subordinate organization represented by organizational number 110 due to a personnel change and, thus, personnel information data in the personnel-organization database 26 is changed. It is further assumed that to a computer of a device number PC001, which has been used by "Hanako Yamakawa" before the personnel change, an employee number E0001 of "Taro Suzuki" is provided as new device data after the personnel change. In this case, as briefed at legend (1) in FIG. 6, the system management program 220 detects the personnel change in response to a change action for the personnel-organization database (PO-DB) 26, or in response to the occurrence of any difference in the personnel information data stored in the personnel-organization database 26 before and after the change action.

Next, as briefed at legend (2) in FIG. 6, the system management program 220 retrieves the system management database (SM-DB) 24, acquires device data including device number PC002 of the computer that has been used by "Hanako Yamakawa", and further acquires the latest device data from the computer of device number PC002 via the communication network 10 in an online manner. If the acquired device data do not match each other, the system management program 220 confirms a user's change (more particularly, the fact that the computer of the device number PC002 has been transferred from "Hanako Yamakawa" to "Taro Suzuki").

Next, as briefed at legend (3) in FIG. 6, the system management program 220 changes the device data for the computer having the device number PC002 as stored in the system management database 24 to be consistent with the personnel information data of "Taro Suzuki" as stored in the personnel-organization database 26, and it automatically updates the contents of the system management database 24.

Now, with reference to FIG. 7, the first database synchronization process will be described in detail. First, procedures (S302 to S322) executable on the management apparatus 2 in the first database synchronization process will be described. At step 302 (S302), the system management program 220 detects any change of personnel information data in the personnel-organization database (PO-DB) 26, and retrieves/interrogates a user (unprocessed user) who is not yet subject to the process (database synchronization process) for changing device data stored in the system management database 24 in line with the changed personnel information data.

At step 304 (S304), the system management program 220 determines if there is an unprocessed user and, if negative, it terminates the process. Otherwise, it proceeds to S306. At step 306 (S306), the system management program 220 uses, for example, an employee number included in personnel information data of an unprocessed user as a keyword to retrieve/interrogate any device data that includes the same employee number as the keyword and is stored in the system management database (SM-DB) 24. In other words, it is determined if there is any device data of a given one of the managed devices 3 that is registered in the system management database 24 as a device of an unprocessed user.

At step 308 (S308), the system management program 220 uses an address of the managed device 3, that is included in the device data obtained as a result of the interrogation of the system management database 24 at S306, to transmit a system scanning command, as shown in FIG. 5, to the managed devices 3 of the unprocessed user via the communication network 10. Upon receipt of the system scanning command, the managed device 3 of the unprocessed user returns a system scanning response, as shown in FIG. 5. At step 310 (S310), the system management program 220 receives the system scanning response from the managed device 3 via the communication network 10. At step 312 (S312), the system management program 220 uses a keyword (employee number) included in the received system scanning response to retrieve/interrogate the personnel-organization database 26, thereby to acquire personnel information data including this keyword.

At step 314 (S314), the system management program 220 transmits a system information update command, as shown in FIG. 5, to the managed devices 3 of the unprocessed user. Note in this respect that, among the data included in the acquired personnel information data, said system information update command includes additional data (employee number of this user, organizational number of subordinate organization that possesses this managed devices 3, contact point of this user, and the like) in the device data. At step 316 (S316), the system management program 220 updates device data stored in the system management database 24, such that the content of device data received from this managed device 3 of the unprocessed user and additional data in the personnel information data obtained from the personnel-organization database 26 as a result of the retrieval/interrogation match with content of corresponding device data stored in the system management database 24.

At step 318 (S318), the system management program 220 determines if there is another managed device 3 of the same unprocessed user and, if so, it proceeds to S308. Otherwise, it proceeds to S320. At step 320 (S320), the system management program 220 sets up those managed devices 3 of the unprocessed user, which are subject to the database synchronization process at S306 to S318, to indicate that they have been processed. Incidentally, if personnel information data stored in the personnel-organization database 26 is rendered to contain a field for indicating whether or not the database synchronization process with respect to corresponding device data stored in the system management database 24 is finished, such that data indicating an unprocessed state is written into this field until the database synchronization process is finished after any change in personnel information data due to a personnel change, and another data indicating a processed state is written into this field after the database synchronization process is finished, it will be useful in knowing an unprocessed/processed state of the database synchronization process, thereby enabling reliable execution of the database synchronization process.

At step 322 (S322), the system management program 220 determines if the database synchronization process has been executed for device data of the managed devices 3 of all unprocessed users. If so, the process is terminated. Otherwise, it proceeds to S306. The system management program 220 displays results of the first database synchronization process on the display device 200.

Next, procedures (S330 to S336) executable on a given one of the managed devices 3 in the first database synchronization process will be described. At step 330 (S330), the managed program 320 of this managed device 3 determines if a system scanning command or a system information update command is received from the management apparatus 2 via the communication network 10 and, if so, it proceeds to S332. At step 332 (S332), the managed program 320 determines if the received command is a system scanning command and, if so, it proceeds to S334. Otherwise, it determines that the received command is a system information update command and proceeds to S336.

At step 334 (S334), the managed program 320 acquires device data stored in the hard disk drive 34, adds the device data to a system scanning response, transmits it to the management apparatus 2 via the communication network 10, and proceeds to S330 (Function b). Alternatively, at step 336 (S336), the managed program 320 updates device data stored in the hard disk drive 34 consistent with the additional data included in the system information update command received from the management apparatus 2 (Function c). As described, even when the management apparatus 2 executes the database synchronization process, processing of the managed device 3 is the same as the cases where the system scanning process and the system information update process are executed.

Second Database Synchronization Process
(Function E)

Figure 8:
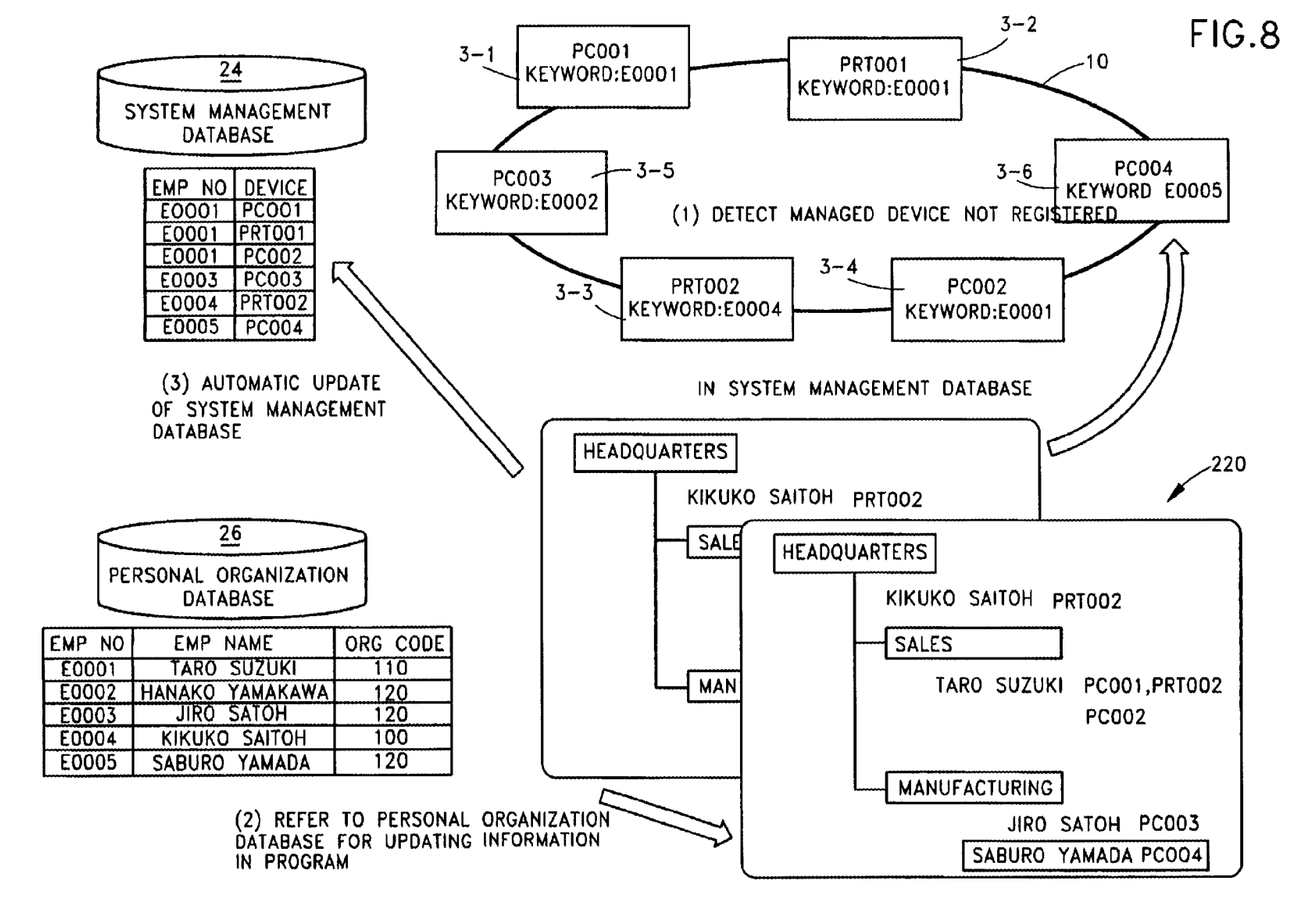
FIG. 8 is a diagram exemplifying a summary of a second database synchronization process shown in FIG. 3.

Hereinbelow, with reference to FIG. 8, a second database synchronization process (S300 in FIG. 3; Function E), which is adapted for use in a case where a given one of the managed devices 3 is newly added to the network system 1, will be described. FIG. 8 is a diagram exemplifying a summary of the second database synchronization process shown in FIG. 3. It is assumed here for the purpose of explaining a specific example as shown in FIG. 8 that, before execution of the second database synchronization process, a computer of device number PC004 has been added to the network system 1 as a new managed device 3. It is further assumed that additional information (employee number and the like) of "Saburo Yamada", whose employee number is E0005, is set up to this added managed device 3.

In this case, as briefed at legend (1) in FIG. 8, the system management program 220 detects, by means of the system scanning function, a given managed device 3 that is newly added to the network system 1 and that is not registered in the system management database (SM-DB) 24. The system management program acquires device data from this detected managed device 3. Next, as briefed at legend (2) in FIG. 8, the system management program 220 creates a record of this new managed device 3 based on the acquired device data, and retrieves/interrogates the personnel-organization database (PO-DB) 26 by using an employee number included in the acquired device data as a keyword.

Next, as briefed at legend (3) in FIG. 8, the system management program 220 acquires personnel information data of "Saburo Yamada" from the personnel-organization database 26, generates device data of this new managed device 3 in line with the acquired personnel information data, and stores the newly generated record in the system management database 24, thereby updating the contents of the system management database 24.

Now, with reference to FIG. 7 again, differences between the first database synchronization process and the second database synchronization process will be described. First, procedures executable on the management apparatus 2 in the second database synchronization process will be described.

In the second database synchronization process, the system management program 220 does not execute procedures of S302 to S306 shown in FIG. 7. Instead, at step 308 (S308), the system management program 220 broadcasts a system scanning command to each of the managed devices 3 via the communication network 10. At step 310 (S310), the system management program 220 receives a system scanning response from each of the managed devices 3 via the communication network 10. At step 312 (S312), the system management program 220 compares device data included in a system scanning response received from each of the managed devices 3 with device data stored in the system management database 24, in order to detect a managed device 3 that is newly added to the network system 1.

In the second database synchronization process, the system management program 220 does not execute the processes of S314 and S316. At step 318 (S318), the system management program 220 determines if there is another managed devices 3 that is newly added to the network system 1 and, if negative, terminates the process. On the other hand, if there is a new managed device 3, it proceeds to S320.

At step 320 (S320), the system management program 220 creates a record of this new managed device 3 in the system management database 24, retrieves the personnel-organization database 26 by using an employee number, which is included in the device data of this new managed device 3 received at S310 as a keyword, creates device data consistent with the personnel information data of a user of this new managed device 3 obtained as a result of the retrieval, stores the created device data into the record in the system management database 24, thereby updating the contents of the system management database 24. At step 322 (S322), the system management program 220 determines if the second database synchronization process has been executed for device data of all of the managed devices 3 that are newly added to the network system 1. If so, the process is terminated. Otherwise, it returns to S320.

As described above, by modifying the first database synchronization process shown in FIG. 7, it is possible to implement the second database synchronization process. Further, even in the second database synchronization process, there is no modification for the procedures (S330 to S336) executable on each of the managed devices 3. Moreover, if the second database synchronization process (which is adapted for use in a case where a new managed device 3 is added to the network system 1) is so modified as to detect a removed managed device 3 based on device data obtained from each of the managed devices 3, to delete device data of this removed managed device 3 from the system management database 24, and to delete data relating to this removed managed device 3 from personnel information data stored in the personnel-organization database 26, it will be possible to apply the second database synchronization process to a case where a managed device 3 is removed from the network system.

System Display Function (Function B)

Figure 9:
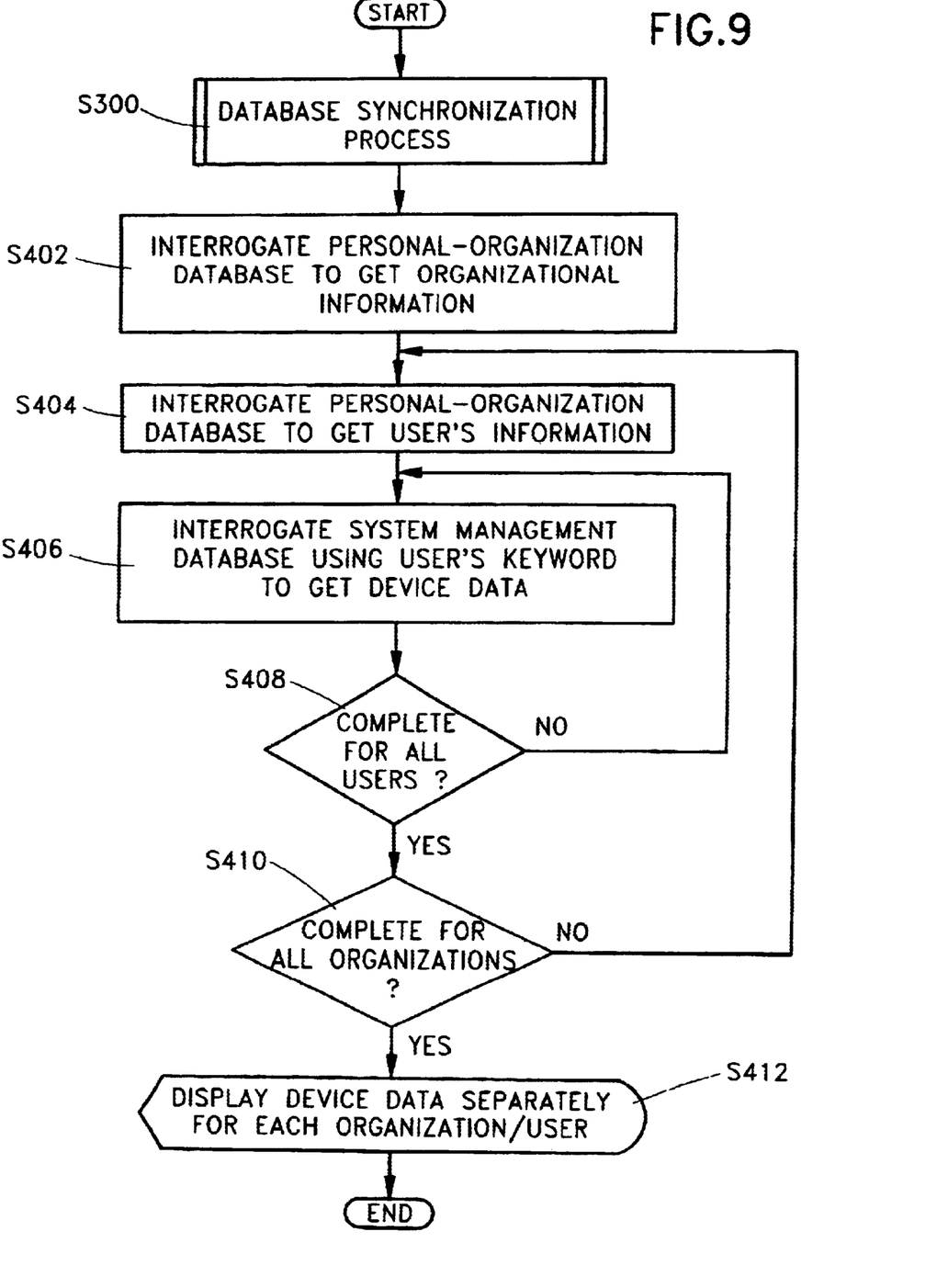
FIG. 9 is a flow chart showing a system display process shown in FIG. 3.

Hereinbelow, with reference to FIG. 9, the system display function (Function B) shown in S400 in FIG. 3 will be described. In the case of executing the system display function as shown in FIG. 9, the system management program 220 executes the database synchronization process (S300 in FIG. 3, FIGS. 6 to 8). At step 402 (S402), the system management program 220 retrieves the personnel-organization database (PO-DB) 26, and acquires information of existing subordinate organizations. At step 404 (S404), the system management program 220 selects either one of the acquired subordinate organizations, and acquires personnel information data of users belonging to the selected subordinate organization.

At step 406 (S406), the system management program 220 retrieves the system management database (SM-DB) 24 by using an employee number included in the acquired personnel information data as a keyword, and acquires device data of all of the managed devices 3 that are used by one of the users who belongs to this subordinate organization. At step 408 (S408), the system management program 220 determines if the device data of managed devices 3 used by all users who belongs to this subordinate organization have been acquired and, if so, it proceeds to S410. Otherwise, it returns to S406.

At step 410 (S410), the system management program 220 determines if device data of managed devices 3 used by users who belong to all subordinate organizations have been acquired and, if so, it proceeds to S412. Otherwise, it returns to S404. At step 412 (S412), the system management program 220 arranges employee numbers, names and the like included in the acquired personnel information data in association with each of the subordinate organizations, associates keywords such as employee numbers or the like included in the personnel information data so arranged with device data of the managed devices 3 that include the same keywords, and displays them in the form of tables for each of the subordinate organizations/individuals (S114 in FIG. 3).

As described above, in accordance with the system management method of this invention, it is always possible to automatically maintain consistency between contents of the system management database 24 and contents of the personnel-organization database 26, even where a managed device 3 is newly added to the network system 1 or any of the managed devices 3 constituting the network system 1 is changed. Further, in accordance with the system management method of this invention, it is possible to manage device data for each of the managed devices 3 in the network system 1 in association with subordinate organizations that possess the managed devices 3 and users, whereby efforts of a system administrator may be significantly reduced and yet occurrence of working errors may be prevented.

It should be noted here that the configuration of the network system 1 shown in FIG. 1 is exemplary and it may be readily modified by those skilled in the art in terms of number of each constituent and types thereof. By the same token, the processing algorithm executable on each constituent of the network system 1 is exemplary and may be replaced by another algorithm provided that each accomplish substantially the same functions and performance.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. In a computer system including a plurality of managed devices and a system management apparatus for managing at least one device data item of each of said managed devices, wherein said managed devices and said system management apparatus communicate with each other via a network, each of said managed devices having a unique device data item and a keyword data item assigned thereto, and each of said managed devices being responsive to a scanning operation via said network for returning said assigned device data item and keyword data item, said system comprising:

system management apparatus comprising:
      an information handler for handling a plurality of information data items in an information database, each information data item having a keyword data item correlated to said keyword data item associated with each of said managed devices;
      a device database for storing said device data items of said managed devices respectively, and for storing said keyword data items in association with said device data items respectively;
      device change detecting means for issuing system scanning commands to each of said managed devices, said device change detecting means being responsive to a system scanning response comprising said device data item and said keyword data item returned from each of said managed devices, for detecting at least one change including change to said devices and change to said device data items;
      first device database updating means for updating stored device data items and keyword data items, consistent with said detected device change; and
      second device updating means for automatically issuing system update commands comprising keyword data and updated device data items to said managed devices based on changes to said information database;
      wherein said information handler automatically interrogates said information database to determine whether said information data items require automatic updating in response to changes to said device data items; and
   managed devices comprising:
      device database means for storing device data items and associated keyword data items; and
      device database control means for updating device data items in response to received system update commands and for generating system scanning responses directly in response to system scanning commands.

2. The system management apparatus of claim 1, wherein said information data item and said device data item include at least one common content element, further comprising:
   second device database updating means for updating the at least one common content element of said device data item, which is stored in said device database and is assigned to a given one of said managed devices, in line with said information data item that is managed by said information handler and has said keyword data item associated with said device data item to be updated.

3. The system management apparatus of claim 2 wherein said information data item represents an information item of a user of said managed device, said keyword data item represents said user of said managed device, and said device data item includes at least a portion of said information item of said user of said managed device.

4. The system management apparatus of claim 1 wherein said information data item represents an information item of a user of said managed device, said keyword data item represents said user of said managed device, and said device data item includes at least a portion of said information item of said user of said managed device.

5. In a system including a plurality of managed devices and a system management apparatus for managing at least one device data item for each of said managed devices, wherein said managed devices and said system management apparatus communicate with each other via a network, each of said managed devices having a unique device data item and a keyword data item assigned thereto, and each of said managed devices being responsive to a scanning operation via said network for returning said assigned device data item and keyword data item, a system management method comprising the steps of:

obtaining a plurality of information data items about said system, each information data item having said keyword data item and storing said information data items at a system management information database;
   storing at a system management device database said device data items of said managed devices respectively, correlating keyword data items from each said information data item to a keyword data item for each of said managed devices and storing said keyword data items in association with said device data items respectively;
   generating system scanning commands to each of said managed devices and, responsive to said device data item and said keyword data item returned directly from each of said managed devices, detecting a device change including at least one of a change to a managed devices and a change to one of said device data items;
   automatically updating said device data item and said keyword data item at said system management device database, responsive to said detected device change;
   automatically generating system update commands to said managed devices; and
   updating device databases at said managed devices in response to system update commands.

6. The system management method of claim 5, wherein said information data item and said device data item include at least one common content element, additionally comprising the step of:
   updating the at least one common content element of said device data item, which is stored in said device database and is assigned to a given one of said managed devices, in line with said information data item that is managed by said information handler and has said keyword data item associated with said device data item to be updated.

7. The system management method of claim 6, wherein said information data item represents an information item of a user of said managed device, said keyword data item represents said user of said managed device, and said device data item includes at least a portion of said information item of said user of said managed device.

8. The system management method of claim 5, wherein said information data item represents an information item of a user of said managed device, said keyword data item represents said user of said managed device, and said device data item includes at least a portion of said information item of said user of said managed device.

9. A machine readable storage medium for storing a program adapted for use in a system including a plurality of managed devices and a system management apparatus for managing at least one device data item of each of said managed devices, wherein said managed devices and said system management apparatus communicate with each other via a network, each of said managed devices having a unique device data item and a keyword data item assigned thereto, and each of said managed devices being responsive to a scanning operation via said network for returning said assigned device data item and keyword data item, said program being executable by a computer for causing said system management apparatus to carry out machine-effected steps of:

obtaining a plurality of information data items about said system, each information data item having said keyword data item and storing said information data items at a system management information database;

storing at a system management device database said device data items of said managed devices respectively, correlating keyword data items from each said information data item to a keyword data item for each of said managed devices, and storing said keyword data items in association with said device data items respectively;

generating system scanning command to each of said managed devices and, responsive to said device data item and said keyword data item returned directly from each of said managed devices, automatically detecting a device change including at least one of a change in a given one of said managed devices and a change in a given one of said device data items;

automatically updating said device data item and said keyword data item at said system management device database responsive to said detected device change;

automatically generating system update commands to said managed devices; and updating device databases at said managed devices in response to system update commands.

10. The machine readable storage medium of claim 9, wherein said information data item and said device data item include at least one common content element, and wherein said program is executable by said computer for causing said system management apparatus to carry out an additional machine-effected step of:

updating the at least one common content element of said device data item, which is stored in said device database and is assigned to a given one of said managed devices, in line with said information data item that is managed by said information handler and has said keyword data item associated with said device data item to be updated.

* * * * *